United States Patent
Ishida

(10) Patent No.: US 6,564,069 B1
(45) Date of Patent: May 13, 2003

(54) MOBILE COMMUNICATION APPARATUS

(75) Inventor: Takayasu Ishida, Shizuoka (JP)

(73) Assignee: NEC Corporation, Tokyo (JP)

(*) Notice: Subject to any disclaimer, the term of this patent is extended or adjusted under 35 U.S.C. 154(b) by 388 days.

(21) Appl. No.: 09/593,685

(22) Filed: Jun. 14, 2000

(30) Foreign Application Priority Data

Jun. 15, 1999 (JP) ............................................. 11-168215

(51) Int. Cl.[7] ................................................ H04B 1/40
(52) U.S. Cl. ...................... 455/552; 455/101; 455/103; 455/132; 455/272
(58) Field of Search ................................. 455/552, 553, 455/73, 24, 13.1–13.4, 80, 101, 102, 103, 272, 132, 140, 282, 281, 280, 276.1

(56) References Cited

U.S. PATENT DOCUMENTS 5,263,187 A * 11/1993 Sugawa et al. ............. 455/245

FOREIGN PATENT DOCUMENTS

| GB | 2 343 592 | 5/2000 |
|---|---|---|
| JP | 7-30459 | 1/1995 |
| JP | 7-235894 | 9/1995 |

* cited by examiner

Primary Examiner—Lee Nguyen
Assistant Examiner—Earl Moorman
(74) Attorney, Agent, or Firm—Foley & Lardner

(57) ABSTRACT

The invention provides a mobile communication apparatus of the diversity system including a plurality of transmitter-receivers of different transmission/reception systems wherein a drop of the antenna reception sensitivity of one system by an output from the antenna of the other system is minimized and the synchronism keeping accuracy is augmented and besides unnecessary dissipation of power is prevented. The mobile communication apparatus includes a first transmitter-receiver including a transmission antennae and operable for outputting, upon transmission, a gain decrease instruction, a second transmitter-receiver including a plurality of antennae and operable for selecting one of the plurality of antennae which has a high antenna gain so as to be used for reception, and a gain adjustment section for decreasing an antenna gain of one of the plurality of antennae of the second transmitter-receiver which has a high degree of coupling to the transmission antenna of the first transmitter-receiver in accordance with the gain decrease instruction.

20 Claims, 5 Drawing Sheets

MOBILE COMMUNICATION APPARATUS

BACKGROUND OF THE INVENTION

1. Field of the Invention

The present invention relates to a mobile communication apparatus suitable for use with a combination type portable telephone set which can transmit and receive in accordance with a plurality of transmission/reception systems.

2. Description of the Related Art

In mobile telecommunication wherein a portable telephone set or the like is used, radio wave propagation across a plurality of obstacles is expected upon transmission/reception, for example, in an urban district. Arriving waves having passed through a plurality of paths suffer from significant fading, and as a result, communication failure or communication interruption in mobile communication by standing waves originating from such fading occurs. Therefore, in mobile communication, a diversity system is sometimes used wherein two or more antennae are used for transmission/reception and one of received waves which has a higher level is selected or two waves are combined so that the probability in deterioration of the reception quality may be reduced when compared with another case wherein a single received wave is use. Generally, a portable telephone set uses selection combining wherein only that one of a plurality of fading waves inputted individually using a plurality of antennae which has a maximum envelope level is selectively received.

Conventionally, such a portable telephone set of the PDC (personal digital cellular)/PHS (personal handyphone system) combination type employing the diversity system as shown in FIG. 5 is known. Referring to FIG. 5, the conventional portable telephone set of the PDC/PHS combination type shown includes a PHS transmitter-receiver 30A, a PDC transmitter-receiver 30B, and a CPU 312 for controlling the transmitter receivers 30A and 30B. The PHS transmitter-receiver 30A includes a PHS antenna circuit 301 having a single antenna, a PHS reception circuit 302 and a PHS transmission circuit 303, a transmission/reception switching circuit 301a, a phase-locked loop (PLL) IC 304, and a PHS modulation/demodulation circuit 305. Meanwhile, the PDC transmitter-receiver 30B includes a PDC antenna circuit 306 having two antennae, an antenna switching circuit 307, a PDC reception circuit 308 and a PDC transmission circuit 310, a PDC local circuit 309, and a PDC modulation/demodulation IC 311.

It is expected that such a portable telephone set of the combination type as described above is used such that both of transmission/reception systems operate for reception in order to make up for drawbacks of both of the PDC and PHS signal systems particularly in a reception waiting state. Generally, the PDC system is more advantageous upon high speed movement of the telephone set or in terms of the extent of a service area, and the PHS is more advantageous when the telephone set is used on a subway or on an underground market. Further, where such a great number of other users use telephone sets that connection of a telephone call cannot be established readily, one of the systems which has a comparatively great number of free circuits can be selectively used for a telephone call.

When such a portable terminal set of the combination type as described above is designed, a control system is sometimes used wherein, in order to suppress power consumption or from some other object, operation of the two systems is not controlled finely in a waiting state, but when communication is proceeding using one of the PDC and PHS transmission/communication systems, the power supply to a radio section of the transmission/reception system which is not in use is disconnected.

However, the conventional portable telephone set of the combination type has the following problems.

In particular, the PDC and PHS transmission/reception systems are complicated in control for establishment of synchronism due to measures for prevention of tapping and so forth, and usually they perform transmission/reception operations independently of each other until it is confirmed that reception data from one of the transmission/reception systems is a telephone number of the telephone set of the combination type itself. Accordingly, when either one of the PDC and PHS transmission/reception systems performs a transmission/reception operation such as position registration, the other system side may be at a reception timing of intermittent reception. As a result, the conventional portable telephone set of the combination type is disadvantageous in that one of the two systems cannot perform reception accurately and may possibly come out of synchronism.

Further, if synchronism is lost, then operation such as continuous reception is performed in order to establish synchronism again, resulting in another disadvantage that unnecessary power is dissipated.

SUMMARY OF THE INVENTION

It is an object of the present invention to provide a mobile communication apparatus of the diversity system including a plurality of transmitter-receivers of different transmission/reception systems wherein a drop of the antenna reception sensitivity of one system by an output from the antenna of the other system is minimized and the synchronism keeping accuracy is augmented and besides unnecessary dissipation of power is prevented.

In order to attain the object described above, according to the present invention, there is provided a mobile communication apparatus, comprising a first transmitter-receiver for outputting, upon transmission, a gain decrease instruction, the first transmitter-receiver having a transmission antennae, a second transmitter-receiver including a plurality of antennae and operable for selecting one of the plurality of antennae which has a high antenna gain so as to be used for reception, the first and second transmitter-receivers employing different transmission/reception systems from each other, and gain adjustment means for decreasing an antenna gain of one of the plurality of antennae of the second transmitter-receiver which has a high degree of coupling to the transmission antenna of the first transmitter-receiver in accordance with the gain decrease instruction.

The gain adjustment means may operate in response to a transmission control signal from the first transmitter-receiver.

The gain adjustment means may be a Schottky barrier diode which is connected, on a cathode side thereof, to that one of the plurality of antennae of the second transmitter-receiver which has a high degree of coupling to the transmission antenna of the first transmitter-receiver and connected, on an anode side thereof, to the first transmitter-receiver and is turned on in response to arrival of the gain decrease instruction.

Alternatively, the gain adjustment means may be a variable capacity diode which is connected between the first transmitter-receiver and that one of the plurality of antennae of the second transmitter-receiver which has a high degree of coupling to the transmission antenna of the first transmitter-receiver and is turned on in response to arrival of the gain decrease instruction.

The first transmitter-receiver may be a transmitter-receiver of the personal handyphone system, and the second transmitter-receiver may be a transmitter-receiver of the personal digital cellular system.

Where a mobile communication apparatus having such a construction as described above is incorporated in a portable telephone set, the portable telephone set becomes a portable telephone set of the combination type. In this instance, preferably the antennae employ a space diversity system and selective combining is used as a combination reception method.

Where the present invention is applied to a portable telephone set of the PDC/PHS combination type, when the PHS section transmits during intermittent waiting of the PDC section, the gain of one of the two PDC antennae which exhibits higher input power of a PHS transmission wave, that is, the gain of the antenna which has a higher degree of coupling to the PHS antenna, is decreased while the other antenna which exhibits lower input power of the PHS transmission wave, that is, the antenna which has a lower degree of coupling to the PHS antenna, is selected by the antenna diversity. Consequently, sensitivity deterioration by high input sensitivity suppression upon PHS transmission of the PDC reception section which has a short reception interval and includes the two antennae can be minimized.

With the mobile communication apparatus having the construction described above, although otherwise there is the possibility that the sensitivity may be deteriorated when the PHS section transmits during intermittent waiting of the PDC section, since the PDC antenna which has a lower degree of coupling to the PHS antenna is selected, the deterioration amount when sensitivity deterioration occurs can be minimized. Consequently, the mobile communication apparatus is advantageous in that the accuracy with which synchronism of the PDC section can be kept is augmented.

Further, if synchronism is lost, then usually a continuous reception operation is performed to try to detect a synchronizing signal. However, with the mobile communication apparatus, since synchronism of the PDC section can be kept, there is no necessity of performing continuous reception. Consequently, the mobile communication apparatus is advantageous in that unnecessary dissipation of power can be suppressed.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
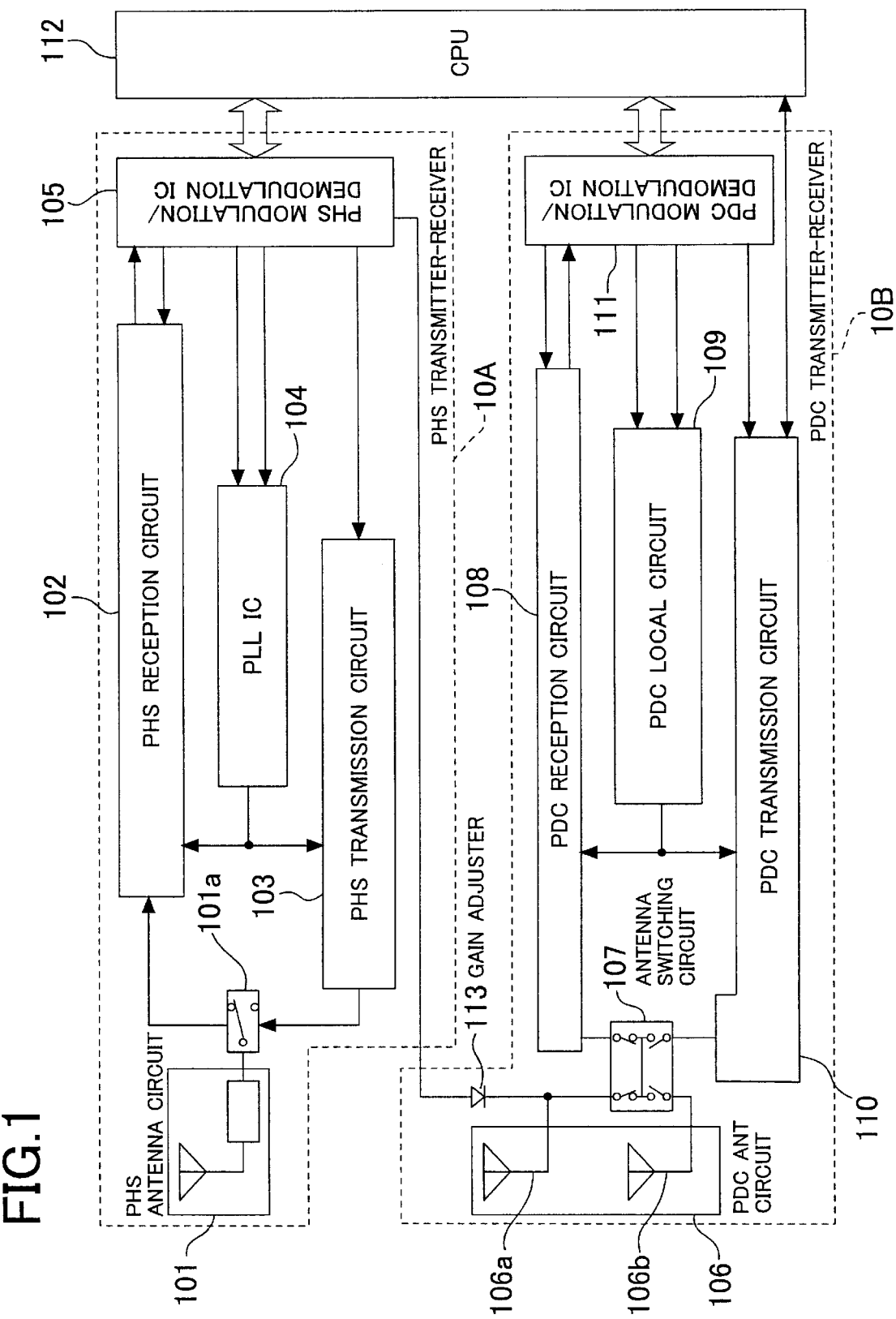
FIG. 1 is a block diagram showing an example of a construction of a portable telephone set of the PDC/PHS combination type to which the present invention is applied.

Referring first to FIG. 1, there is shown an example of a construction of a portable telephone set of the combination type according to the present invention which includes two transmission/reception systems, that is, the PDC and PHS transmission/reception system. The portable telephone set of the combination type includes a PHS transmitter-receiver 10A, a PDC transmitter-receiver 10B, and a CPU 112. The PHS transmitter-receiver 10A includes a PHS antenna circuit 101 having one PHS antenna, a PHS reception circuit 102 and a PHS transmission circuit 103, a transmission/reception switching circuit 110a, a phase-locked loop (PLL) IC 104, and a PHS modulation/demodulation IC 105. Meanwhile, the PDC transmitter-receiver 10B includes a PDC antenna circuit 106 including two first and second PDC antennae 106a and 106b, an antenna switching circuit 107, a PDC reception circuit 108 and a PDC transmission circuit 110, a PDC local circuit 109, a PDC modulation/demodulation IC 111, and a gain adjuster 113.

In order to vary the matching condition between the PDC antenna circuit 106 and the PDC reception circuit 108 upon PHS transmission using a transmission control signal of the PHS, the PHS modulation/demodulation IC 105 and the PDC antenna circuit 106 are connected to each other through the gain adjuster 113.

The PHS reception circuit 102 and the PHS transmission circuit 103 of the PHS transmitter-receiver 10A are selectively, connected to the PHS antenna circuit 101 through the transmission/reception switching circuit 101a. A signal (PHS reception data) from the PHS reception circuit 102 is supplied through the PHS modulation/demodulation IC 105 to and processed by the CPU 112.

The PDC reception circuit 108 and the PDC transmission circuit 110 are connected to the two PDC antennae 106a and 106b of the PDC antenna circuit 106 through the antenna switching circuit 107. The PDC antenna 106a is connected also to the PHS modulation IC 105 through the gain adjuster 113. A signal (PDC reception data) from the PDC reception circuit 108 is supplied through the PDC modulation/demodulation IC 111 to and processed by the CPU 112.

When the PHS transmitter-receiver 10A transmits from the PHS antenna circuit 101, the gain adjuster 113 added to the PDC antenna 106a which has a higher degree of coupling to the PHS antenna in advance operates in response to the level of the transmission control signal from the PHS modulation/demodulation IC 105 so that the antenna gain of the PDC antenna 106a of the PDC antenna circuit 106 decreases. If the PDC transmitter-receiver 10B receives in this state, then an antenna diversity operation is performed to select the PDC antenna 106b whose antenna gain is not reduced to perform a reception operation. Consequently, upon transmission of the PHS transmitter-receiver 10A, when the transmission level from the PHS antenna of the PHS antenna circuit 101 is high, a reception operation can be performed by the antenna 106b which has a lower degree of coupling to the PHS antenna. In the portable telephone set of the combination type shown in FIG. 1, a Schottky diode is used for the gain adjuster 113. However, some other suitable device such as a variable capacity diode may be used in place of the Schottky diode.

Since the construction of the PHS transmitter-receiver 10A and the construction of the PDC transmitter-receiver 10B except the gain adjuster 113 described above are well known to those skilled in the art, detailed description of the same is omitted.

Figure 2:
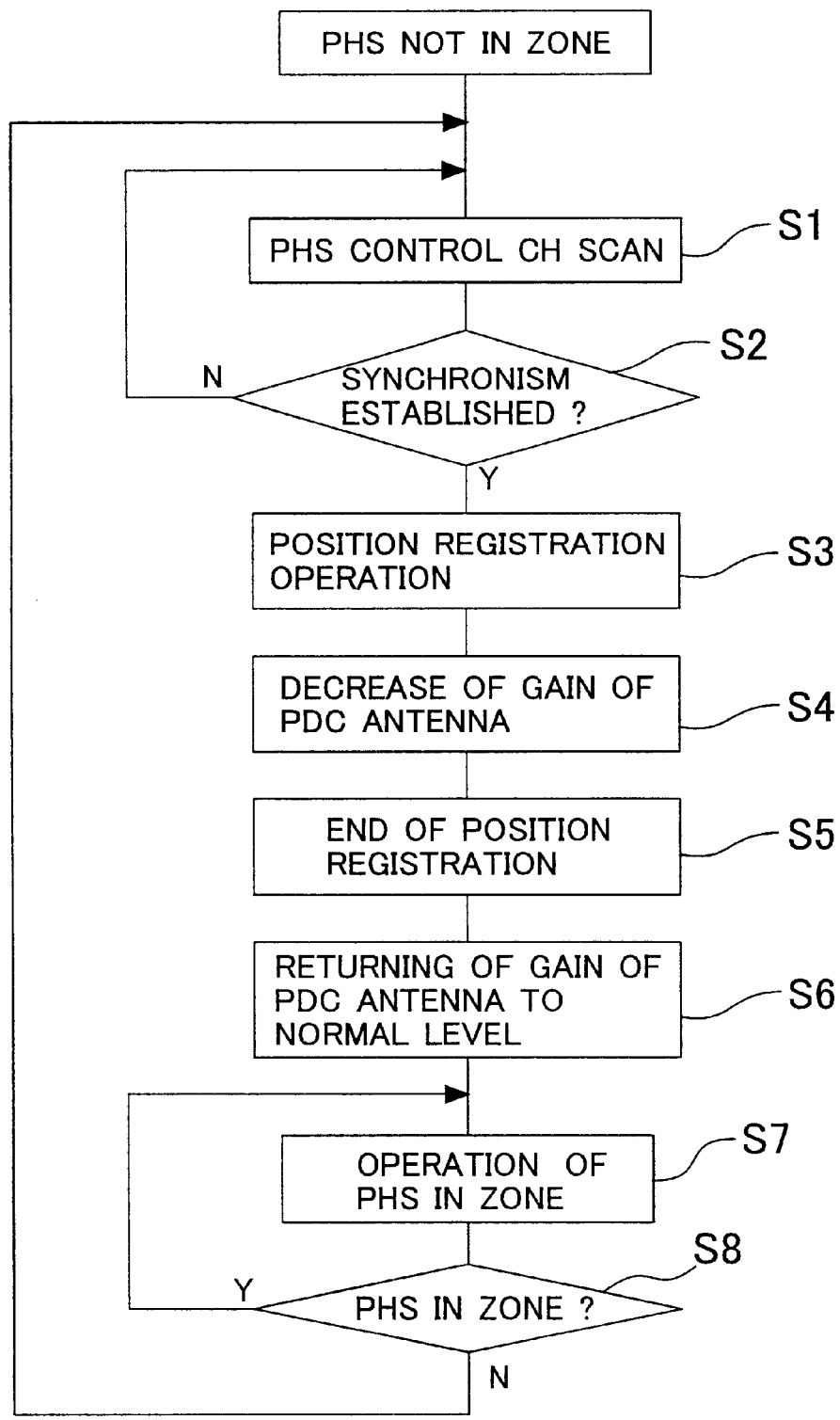
FIG. 2 is a flow chart illustrating operation of a PHS transmitter-receiver shown in FIG. 1 when position registration is performed.
Figure 3:
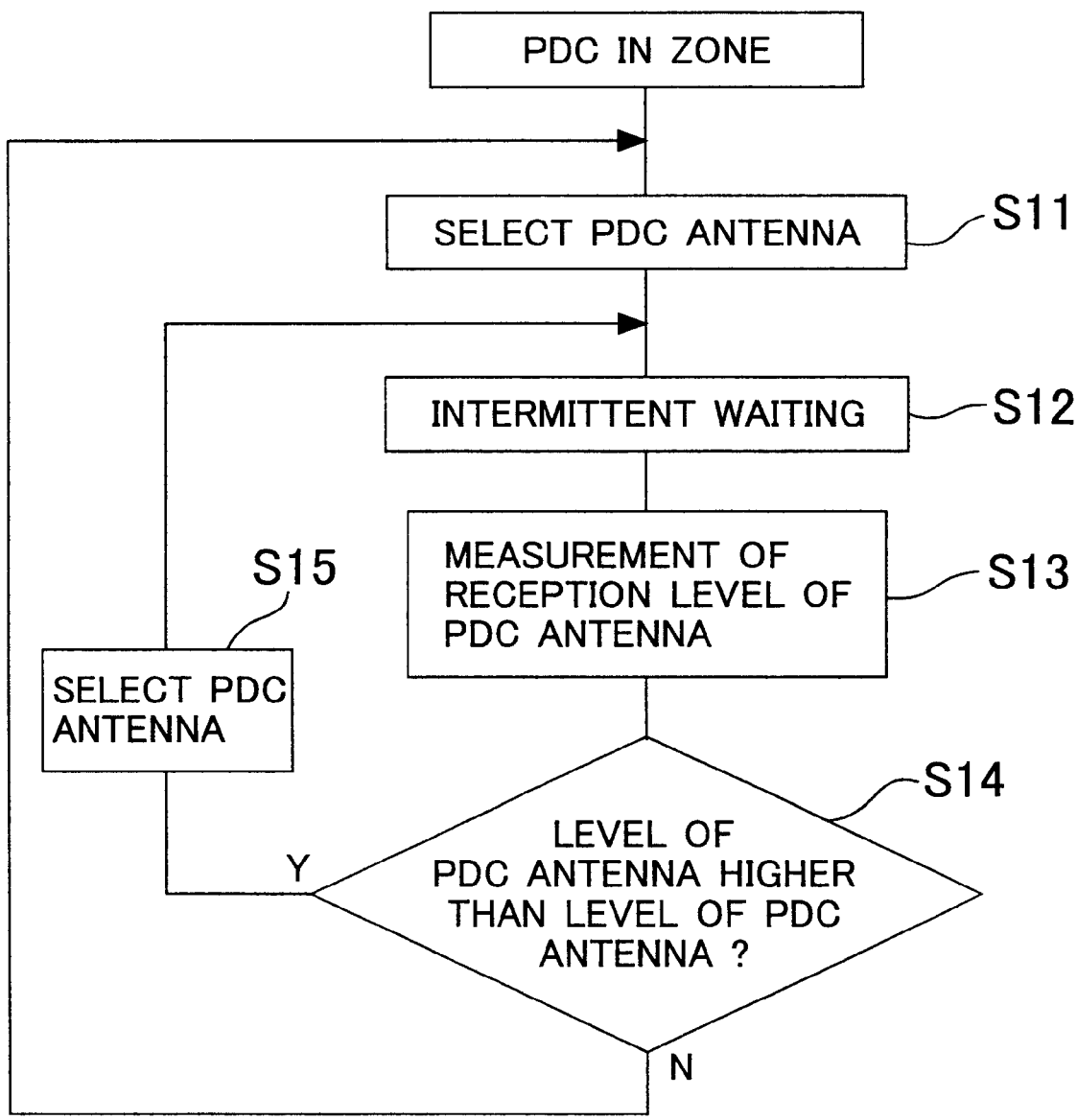
FIG. 3 is a flow chart illustrating operation of a PDC transmitter-receiver shown in FIG. 1 when antenna diversity is performed upon intermittent reception.
Figure 4:
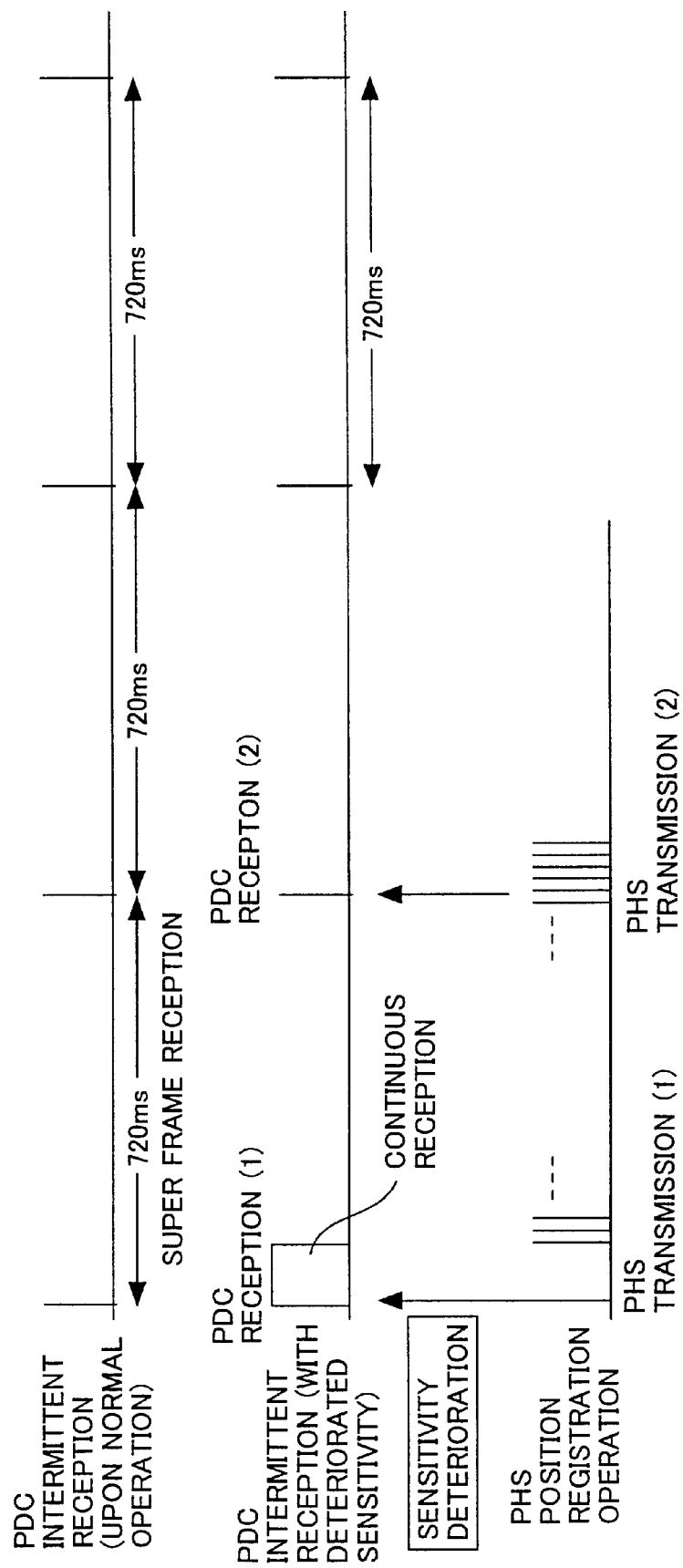
FIG. 4 is.a timing chart of the PHS transmitter-receiver and the PDC transmitter-receiver shown in FIG. 1.
Figure 5:
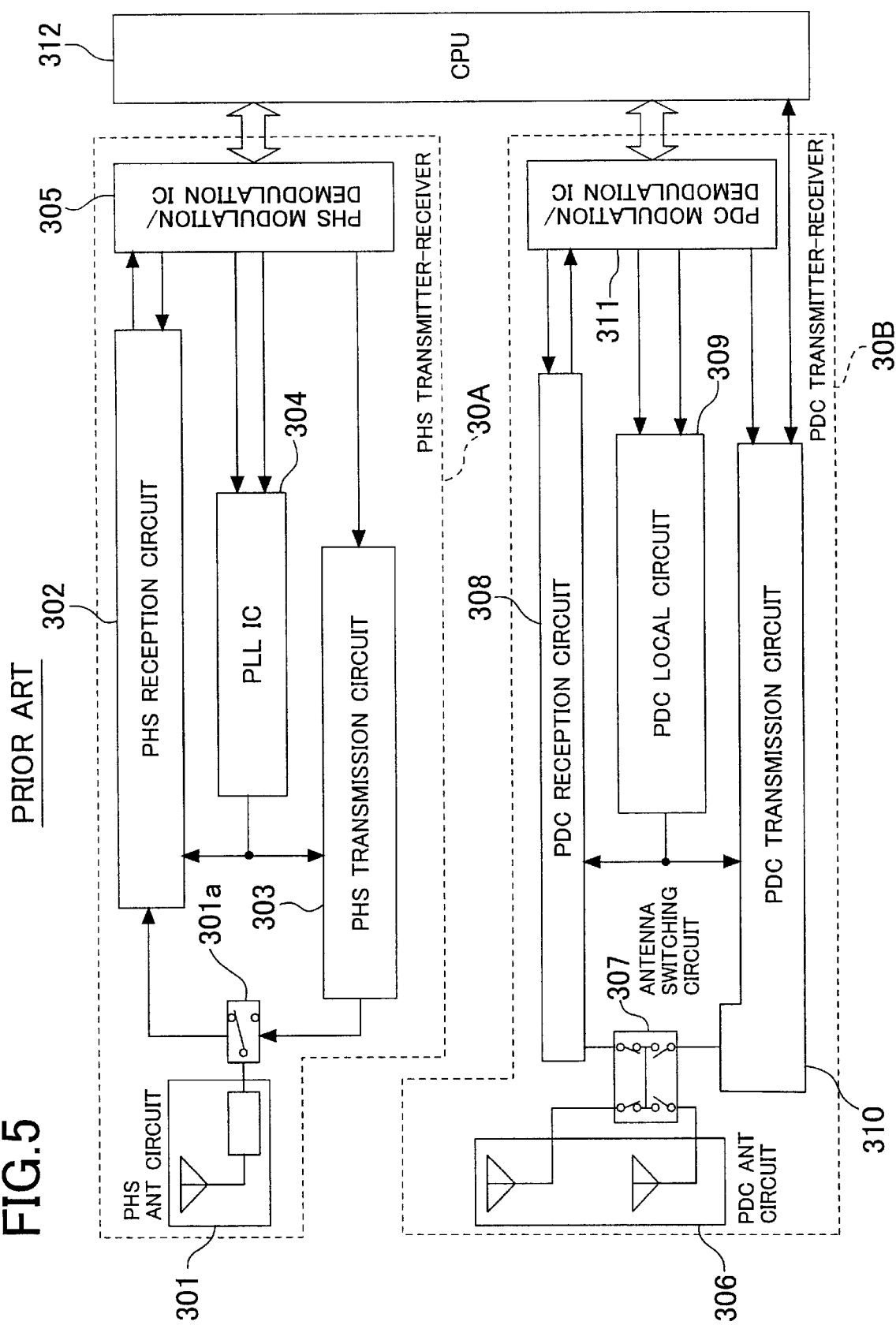
FIG. 5 is a block diagram showing a construction of a conventional portable telephone set of the PDC/PHS combination type.

In the following, operation of the present embodiment is described. FIG. 2 illustrates operation of the PHS transmitter-receiver 10A shown in FIG. 1 when position registration is performed, and FIG. 3 illustrates operation of the PDC transmitter-receiver 10B shown in FIG. 1 when antenna diversity is performed upon intermittent reception. Further, FIG. 4 illustrates operation of the PHS transmitter-receiver 10A and the PDC transmitter-receiver 10B shown in FIG. 1.

The transmission/reception systems of the PHS transmitter-receiver 10A and the PDC transmitter-receiver 10B are complicated in control in synchronism establishment and so forth due to measures for prevention of tapping or the like and continues transmission/reception operations independently of each other until it is confirmed that reception data from one of the transmission/reception systems is a telephone number of the portable telephone set itself.

Referring particularly to FIG. 2, the PHS transmitter-receiver 10A scans PHS control channels (step Sl), and if synchronism is established (Y (Yes) in step S2), then the PHS transmitter-receiver 10A starts a position registration operation (step S3). Then, the PHS transmitter-receiver 10A decreases the gain of the first PDC antenna 106a of the PDC transmitter-receiver 10B (step S4), and ends the position registration operation (step S5). Thereafter, the PHS transmitter-receiver 10A returns the gain of the first PDC antenna 106a to its normal level (step S6), and then performs processing in a waiting zone of the PHS system (step S7). The PHS transmitter-receiver 10A continues the processing in step S7 while it successively confirms whether or not the portable telephone set is within the zone (step S8).

Referring now to FIG. 3 if the portable telephone set enters a waiting zone of the PDC system, then the PDC transmitter-receiver 10B selects the first PDC antenna 106a (step S11) and performs intermittent waiting (step S12). Then, the PDC transmitter-receiver 10B measures the reception level of the second PDC antenna 106b (step S13), and compares the measured reception level of the second PDC antenna 106b with the reception level of the first PDC antenna 106a (step S13). Then, if the reception level of the first PDC antenna 106a is higher than the reception level of the second PDC antenna 106b, then the PDC transmitter-receiver 10B selects the first PDC antenna 106a and performs intermittent waiting (step S12).

The PHS transmitter-receiver 10A sometimes performs transmission also in intermittent reception such as position registration upon changing of a waiting zone. In this instance, since the PHS transmitter-receiver 10A and the PDC transmitter-receiver 10B perform transmission/reception operations independently of each other as described above, an intermittent, reception operation state of the PDC transmitter-receiver 10B cannot be taken into consideration.

Therefore, if a PHS position registration operation is performed upon intermittent reception of the PDC system, then when sensitivity deterioration occurs as in PDC reception (1) in the timing chart of FIG. 4, a continuous reception mode is entered in order to detect a synchronizing signal of a circuit. However, if an operation of PDC reception (2) is performed in a state wherein the gain adjuster 113 is operating upon PHS transmission (2), then since the sensitivity has been deteriorated upon the preceding reception, the PDC transmitter-receiver 10B performs a diversity operation. As a result, the PDC antenna 106a which has a lower degree of coupling to the PHS antenna is selected to perform a reception operation. Consequently, augmentation of the synchronism keeping accuracy of the PDC transmitter-receiver 10B is allowed.

As described above, since a PHS radio section transmission control signal is made use of so that, only while the PHS system is transmitting, the PDC antenna 106a which has a higher degree of coupling to the PHS antenna of the PDC transmitter-receiver 10B is substantially disabled, an influence of PHS transmission upon the PDC sensitivity while both of the PHS and the PDC are in an intermittent reception state can be reduced, and also the synchronism keeping accuracy is augmented.

Further, while an increase of the number of parts is suppressed to the minimum, augmentation in convenience to a carrying person and reduction of power dissipation can be achieved.

Furthermore, in the present embodiment, since a control line for exclusive use is not used, a printed circuit board can be reduced in size and raised in density of parts to be mounted thereon.

In addition, the numbers, positions, shapes and so forth of the components described above are not limited to those of the embodiment described above, and numbers, positions, shapes and so forth suitable for carrying out the present invention can be employed.

While a preferred embodiment of the present invention has been described using specific terms, such description is for illustrative purposes only, and it is to be understood that changes and variations may be made without departing from the spirit or scope of the following claims.

What is claimed is:

1. A mobile communication apparatus, comprising:
  a first transmitter-receiver including a transmission antenna and operable for outputting, upon transmission, a gain decrease instruction;
  a second transmitter-receiver including a plurality of antennae and operable for selecting one of said plurality of antennae which has a high antenna gain so as to be used for reception;
  said first and second transmitter-receivers employing different transmission/reception systems from each other; and
  gain adjustment means for decreasing an antenna gain of one of said plurality of antennae of said second transmitter-receiver which has a high degree of coupling to said transmission antenna of said first transmitter-receiver in accordance with the gain decrease instruction.

2. A mobile communication apparatus as claimed in claim 1, wherein said gain adjustment means operates in response to a transmission control signal from said first transmitter-receiver.

3. A portable telephone set, comprising a mobile communication apparatus as claimed in claim 2.

4. A portable telephone set as claimed in claim 3, wherein said plurality of antennae of said second transmitter-receiver employ a space diversity system and selective combining is used as a combination reception method.

5. A portable telephone set as claimed in claim 3, wherein said plurality of antennae of said second transmitter-receiver employ a space diversity system and selective combining is used as a combination reception method.

6. A mobile communication apparatus as claimed in claim 2, wherein the first transmitter-receiver further includes a modulation/demodulation circuit,
  wherein the transmission control signal is output from the modulation/demodulation circuit, and wherein a signal level of the transmission control signal is utilized to provide a corresponding gain decrease amount obtained from the gain decrease instruction.

7. A mobile communication apparatus as claimed in claim 1, wherein said gain adjustment means is a Schottky barrier diode which is connected, on a cathode side thereof, to that one of said plurality of antennae of said second transmitter-receiver which has a high degree of coupling to said transmission antenna of said first transmitter-receiver and connected, on an anode side thereof, to said first transmitter-receiver and is turned on in response to arrival of the gain decrease instruction.

8. A portable telephone set, comprising a mobile communication apparatus as claimed in claim 7.

9. A portable telephone set as claimed in claim 8, wherein said plurality of antennae of said second transmitter-receiver employ a space diversity system and selective combining is used as a combination reception method.

10. A mobile communication apparatus as claimed in claim 1, wherein said gain adjustment means is a variable capacity diode which is connected between said first transmitter-receiver and that one of said plurality of antennae of said second transmitter-receiver which has a high degree of coupling to said transmission antenna of said first transmitter-receiver and is turned on in response to arrival of the gain decrease instruction.

11. A portable telephone set, comprising a mobile communication apparatus as claimed in claim 10.

12. A portable telephone set as claimed in claim 11, wherein said plurality of antennae of said second transmitter-receiver employ a space diversity system and selective combining is used as a combination reception method.

13. A mobile communication apparatus as claimed claim 1, wherein said first transmitter-receiver is a transmitter-receiver of the personal handyphone system.

14. A portable telephone set, comprising a mobile communication apparatus as claimed in claim 13.

15. A portable telephone set as claimed in claim 14, wherein said antennae employ a space diversity system and selective combining is used as a combination reception method.

16. A mobile communication apparatus as claimed in claim 1, wherein said second transmitter-receiver is a transmitter-receiver of the personal digital cellular system.

17. A portable telephone set, comprising a mobile communication apparatus as claimed in claim 16.

18. A portable telephone set as claimed in claim 17, wherein said antennae employ a space diversity system and selective combining is used as a combination reception method.

19. A portable telephone set, comprising a mobile communication apparatus as claimed in claim 1.

20. A mobile communication apparatus as claimed in claim 1, wherein the first transmitter-receiver outputs the gain decrease instruction to the second transmitter-receiver when the first transmitter-receiver in a receiving mode that corresponds to a position registration mode.

* * * * *